(12) United States Patent
Sajassi et al.

(10) Patent No.: US 9,419,817 B2
(45) Date of Patent: *Aug. 16, 2016

(54) STITCHING MULTICAST TREES

(71) Applicant: Cisco Technology, Inc., San Jose, CA (US)

(72) Inventors: Ali Sajassi, San Ramon, CA (US); Samer Salam, Vancouver (CA); Sami Boutros, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,512

(22) Filed: Jun. 16, 2015

(65) Prior Publication Data
US 2015/0280940 A1    Oct. 1, 2015

Related U.S. Application Data

(63) Continuation of application No. 13/369,142, filed on Feb. 8, 2012, now Pat. No. 9,088,517.

(51) Int. Cl.
*H04L 12/46* (2006.01)
*H04L 12/753* (2013.01)
*H04L 12/18* (2006.01)
*H04L 12/751* (2013.01)
*H04L 29/12* (2006.01)
*H04L 12/723* (2013.01)

(52) U.S. Cl.
CPC ........ *H04L 12/4679* (2013.01); *H04L 12/1863* (2013.01); *H04L 45/02* (2013.01); *H04L 45/48* (2013.01); *H04L 61/2069* (2013.01); *H04L 45/50* (2013.01)

(58) Field of Classification Search
CPC ..... H04L 45/48; H04L 45/50; H04L 12/4679; H04L 12/1863; H04L 45/02; H04L 61/2069
See application file for complete search history.

(56) References Cited

U.S. PATENT DOCUMENTS

| | | |
|---|---|---|
| 6,707,796 B1 | 3/2004 | Li |
| 7,860,093 B2 | 12/2010 | Shepherd et al. |
| 8,724,517 B1 | 5/2014 | Bulusu et al. |
| 2005/0053079 A1 | 3/2005 | Havala |
| 2007/0274321 A1 | 11/2007 | Jonsson et al. |
| 2008/0205395 A1 | 8/2008 | Boddapati et al. |
| 2009/0073989 A1 | 3/2009 | Cai et al. |
| 2009/0161670 A1 | 6/2009 | Shepherd et al. |
| 2009/0225650 A1 | 9/2009 | Vasseur |
| 2009/0323706 A1 | 12/2009 | Germain et al. |

(Continued)

*Primary Examiner* — Paul H. Masur
*Assistant Examiner* — Kabir Jahangir
(74) *Attorney, Agent, or Firm* — Polsinelli PC

(57) ABSTRACT

Techniques for stitching multicast trees in a multiple data center environment. According to one embodiment, a technique for stitching multicast trees is provided, which includes determining, at an edge device of a data center, one or more Virtual Local Area Networks (VLANs) assigned to the edge device as a result of a designated forwarder election. An assigned forwarder message is sent by the edge device to one or more devices on the data center, the assigned forwarder message advertising the edge device as a designated forwarder for the VLANs assigned to the edge device. For each of the VLANs assigned to the edge device, the assigned forwarder message causes the edge device to be included in a multicast tree for the VLAN when the assigned forwarder message is received by specific ones of the devices in the data center that are associated with the VLAN.

20 Claims, 4 Drawing Sheets

(56) References Cited

U.S. PATENT DOCUMENTS

| | | |
|---|---|---|
| 2011/0128957 A1 | 6/2011 | Singh et al. |
| 2011/0134802 A1 | 6/2011 | Rajagopalan et al. |
| 2011/0299528 A1 | 12/2011 | Yu et al. |
| 2012/0189009 A1 | 7/2012 | Shekhar et al. |
| 2013/0003733 A1 | 1/2013 | Venkatesan et al. |
| 2013/0003738 A1 | 1/2013 | Koganti et al. |
| 2013/0182581 A1 | 7/2013 | Yeung et al. |
| 2013/0198558 A1 | 8/2013 | Rao et al. |

| Global VLAN | Customer Destination Multicast Group | Multicast Encapsulation Header | |
|---|---|---|---|
| VLAN1 | Multicast Group 1 | --- | 408-1 |
| VLAN1 | Multicast Group 2 | --- | 408-2 |
| VLAN1 | Multicast Group 7 | --- | 408-3 |
| VLAN2 | Multicast Group 1 | --- | 408-4 |
| VLAN2 | Multicast Group 2 | --- | 408-5 |
| VLAN3 | Multicast Group 1 | --- | 408-6 |
| VLAN3 | Multicast Group 5 | --- | 408-7 |
| VLAN4 | Multicast Group 7 | --- | 408-8 |
| VLAN5 | Multicast Group 8 | --- | 408-9 |

*FIG. 4*

| Global VLAN | Multicast Encapsulation Header | |
|---|---|---|
| VLAN1 | --- | 506-1 |
| VLAN1 | --- | 506-2 |
| VLAN1 | --- | 506-3 |
| VLAN2 | --- | 506-4 |
| VLAN2 | --- | 506-5 |
| VLAN3 | --- | 506-6 |
| VLAN3 | --- | 506-7 |
| VLAN4 | --- | 506-8 |
| VLAN5 | --- | 506-9 |

*FIG. 5*

STITCHING MULTICAST TREES

CROSS REFERENCE TO RELATED APPLICATIONS

This application is a continuation of U.S. patent application Ser. No. 13/369,142, filed Feb. 8, 2012, now U.S. Pat. No. 9,088,517, the contents of the above patent application is hereby expressly incorporated by reference in its entirety for all purposes herein.

TECHNICAL FIELD

The present disclosure relates generally to the field of improving transmissions of multicast data between data centers.

BACKGROUND

Large storage environments comprising data centers that are physically and/or logically separated from one another are rapidly replacing stand-alone storage environments. In such large storage environments, data must frequently travel over different networks using different communications protocols to reach their destinations. Due to their decentralized nature, managing data transmissions, particularly multicast data transmissions, in such environments is a difficult and complex task.

Current data center interconnect mechanisms for ensuring that data transmission between multiple data centers occurs efficiently and with minimum disruption have significant limitations. It is desirable to provide improved data center interconnect mechanisms for multicast transmissions.

BRIEF DESCRIPTION OF THE FIGURES

The disclosure may best be understood by reference to the following description taken in conjunction with the accompanying drawings, which illustrate particular example embodiments.

FIG. 4 illustrates a particular example of look up table entries that may be used to stitch multicast trees together according to an embodiment of the present disclosure;

FIG. 5 illustrates a particular example of look up table entries that may be used to stitch multicast trees together according to an embodiment of the present disclosure.

DESCRIPTION OF PARTICULAR EMBODIMENTS

Overview

Figure 1:
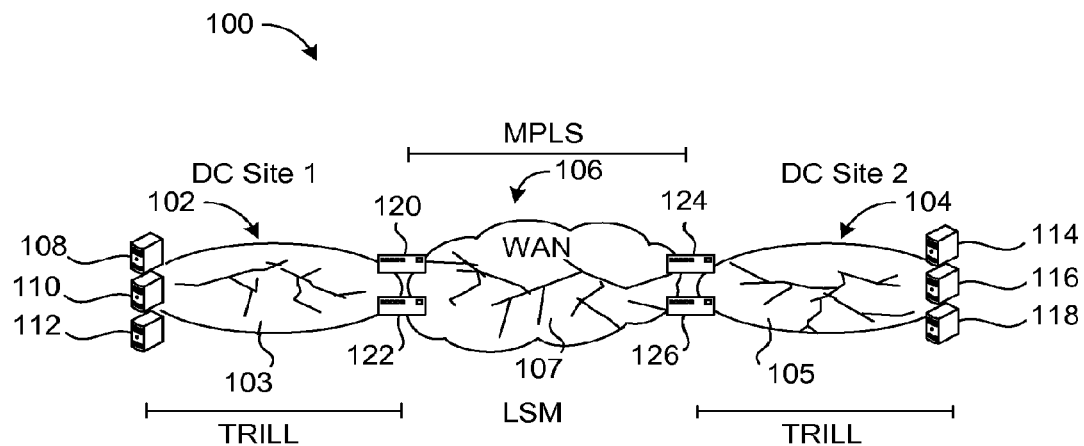
FIG. 1 is a simplified block diagram of an example distributed storage system that may incorporate an embodiment of the present disclosure.

Embodiments of the present disclosure provide techniques for stitching together multicast trees. According to one embodiment, a technique for stitching multicast trees is provided, which includes determining, at an edge device of a data center, one or more Virtual Local Area Networks (VLANs) assigned to the edge device as a result of a designated forwarder election. An assigned forwarder message is sent by the edge device to one or more devices on the data center, the assigned forwarder message advertising the edge device as a designated forwarder for the VLANs assigned to the edge device. For each of the VLANs assigned to the edge device, the assigned forwarder message causes the edge device to be included in a multicast tree for the VLAN when the assigned forwarder message is received by specific ones of the devices in the data center that are associated with the VLAN.

The foregoing, together with other features, embodiments, and advantages of the present disclosure, will become more apparent when referring to the following specification, claims, and accompanying drawings.

Example Embodiments

Embodiments of the present disclosure provide techniques for stitching multicast trees in the context of storage systems comprising multiple data centers. According to an embodiment of the present disclosure, techniques are provided for interconnecting multicast trees of different networks in order to facilitate transmission of multicast data between data centers. An important multicast function in physically and/or logically distinct storage environments is to determine how to interconnect multicast trees in the different networks in a manner that allows for efficient transmission of multicast data while avoiding the creation of forwarding loops and preventing duplicate data transmission. Various embodiments of the present disclosure facilitate transmission of multicast data in a manner that enables efficient data transmission while avoiding the creation of forwarding loops and duplicate data transmission.

The embodiments of the present disclosure discussed below describe techniques for interconnecting multicast trees in the context of a distributed system that includes two data center sites connected by a communications network, which is a Wide Area Network (WAN). It should, however, be understood that the techniques of the present disclosure apply to a variety of different applications and configurations, for example, including systems in which multicast data is sent between more than two data centers, and systems where the data centers are connected by communication networks that are not WANs. Additionally, as will be obvious to one of skill in the art, techniques of the present disclosure may apply in the context of a variety of different network communications protocols including but not limited to those specifically discussed below. Accordingly, the embodiments described below are not meant to limit the scope of the present disclosure. On the contrary, the disclosure is intended to cover alternatives, modifications, and equivalents as may be included within the spirit and scope of the disclosure.

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Reference will now be made in detail to some specific examples of the disclosure. Examples of these specific embodiments are illustrated in the accompanying drawings. FIG. 1 is a simplified block diagram of an example distributed storage system 100 that may incorporate an embodiment of the present disclosure. System 100 includes two data centers 102 and 104 each comprising a plurality of servers, hosts or other devices 108, 110, 112, 114, 116, 118 for accessing or storing data. Data centers 102 and 104 are each coupled to Wide Area Network 106 via a plurality of communication links, the data centers communicating with one another through WAN 106. Wide Area Network 106 will also be referred to as a core network in connection with the below discussion.

Multi-homing a data-center site (for example, 102) to a WAN (for example, 106) via multiple edge devices can provide a more resilient edge interface. It can also provide for better utilization of bandwidth resources by implementing load balancing features. Further, it can assist in providing a higher bandwidth across the interface. Accordingly, sometimes systems provide multiple edge devices, constituting a redundancy group, for coupling a data center to a WAN. For example, as shown in FIG. 1, edge devices 120 and 122 couple data center_1 102 to WAN 106, and edge devices 124 and 126 couple data center_2 104 to WAN 106.

A group of edge devices servicing a particular site may be described as constituting a redundancy group. While for purposes of simplicity the depicted redundancy groups in FIG. 1 each include only two edge devices, it will be understood that many more devices may make up a redundancy group. Further, these edge devices may be routers, switches or other types of network devices.

The existence of redundant edge devices poses particular challenges for multicast transmission because having two or more edge devices can lead to forwarding loops, which can seriously disrupt a network, or can produce duplicate data transmissions, which can waste valuable bandwidth resources.

Further, communication protocols (including multicast data transmission protocols) may be used in the WAN 106 that are different from those used in data centers 102 and 104. Data center sites 102 and 104 running, for example, Next Generation Ethernet (NG-Ethernet) in the control plane (using protocols such as Transparent Interconnection of Lots of Links (TRILL), IEEE 802.1aq or IEEE 802.1 Qbp) may be interconnected over WAN 106 employing, for example, Multi-Protocol Label Switching (MPLS) based Layer 2 Virtual Private Network (L2VPN) technologies (such as Virtual Private LAN Service (VPLS) or Ethernet Virtual Private Network (E-VPN).

For example, within data centers, technology—such as the TRILL protocol mentioned above—may be deployed that allows for delivery of multicast Ethernet traffic inside the data centers in a more optimal fashion. For example, the TRILL technology may operate by building shared multicast trees such as trees 103 and 105. These trees may be built using Intermediate System to Intermediate System protocol (IS-IS). These shared multicast trees handle the delivery of traffic to all members of a destination multicast group within a particular data center for which the trees are built.

In WAN 106, by contrast, multicast traffic may be forwarded on multicast tree 107, which is built using Label Switched Multicast (LSM).

The multicast trees may be either shared Multipoint to Multipoint (MP2MP) trees (as in the case of TRILL), or using source-based Point to Multipoint (P2MP) trees (as in the IEEE 802.1aq scenario).

It will be understood that although only one tree is shown in each of the data centers 102 and 104 and WAN 106 in FIG. 1, in the real world, a number of different multicast trees may be built for each network, for example, one for each of a group of VLANs that a network supports.

An important multicasting function in such distributed data systems is implementing mechanisms for interconnecting multicast trees 103 and 105 of data centers 102 and 104, and multicast tree 107 of WAN 106. Distributed system 100 may allow transmission of data, including multicast data, between devices 108, 110 and 112 in data center site_1 102 and devices 114, 116 and 118 in data center site_2 104, for example. To ensure end to end delivery of multicast traffic, multicast trees 103 and 105, which are associated with data center sites 102 and 104, respectively, may need to be stitched to LSM tree 107 in MPLS WAN 106.

As noted above, techniques for stitching multicast trees may need to address two concerns: (1) that no forwarding loops are formed, because forwarding loops can cause a network to breakdown, and (2) that no duplicate packet delivery occurs, because duplicative data transmission can waste valuable bandwidth resources. In addition, it may be desirable to have seamless handoff of multicast traffic at boundaries between one network and another.

Figure 2:
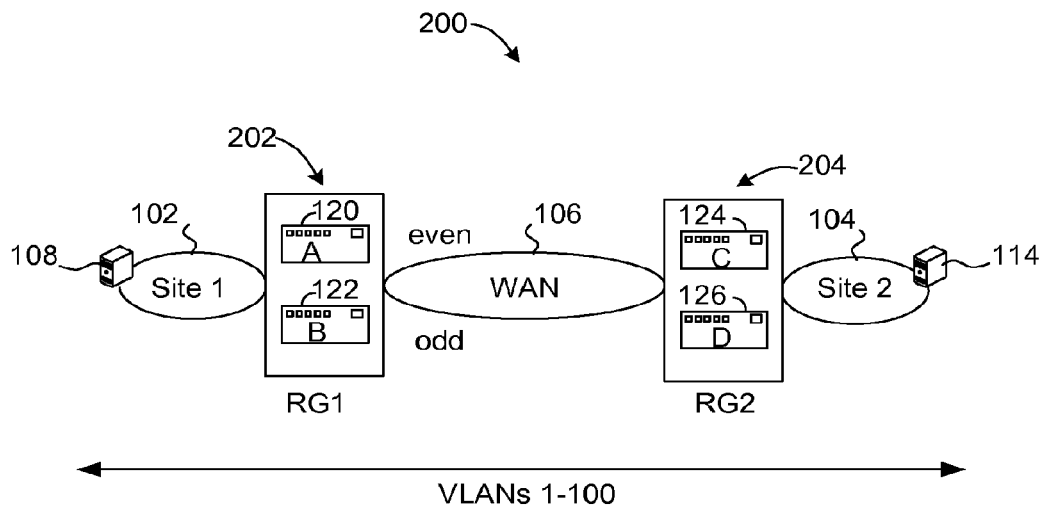
FIG. 2 is a simplified block diagram of an example distributed storage system that may incorporate an embodiment of the present disclosure.

FIG. 2 is a simplified block diagram of an example distributed storage system 200 that may incorporate an embodiment of the present disclosure. Distributed system 200 includes two data centers 102 and 104 each coupled to a WAN 106 across which they communicate with one another. Data centers 102 and 104 are each coupled to WAN 106 via two edge devices. As shown in FIG. 2, each pair of edge devices forms a redundancy group. That is, data center site_1 102 is connected to WAN 106 by edge devices 120 and 122, also labeled A and B in FIG. 2. And data center site_2 104 is connected to WAN 106 by edge devices 124 and 126, also labeled C and D in FIG. 2. Edge device_A 120 and edge device_B 122 form redundancy group_1 202. And edge device_C 124 and edge device_D 126 form redundancy group_2 204.

Physical networks often support a number of virtual Local Area Networks (VLANs). Traffic on a VLAN is kept separate such that each VLAN can function as its own independent segment and traffic on a particular VLAN is unaware of the transmissions in other VLANs. Using such virtual local area networks, a provider is able to provide a user with a simplified representation of a network, one where a network that constitutes numerous geographically dispersed elements can appear to be a single Local Area Network, hence the term Virtual Local Area Network.

Both data centers 102 and 106 may support a number of different VLANs. For example, a company's Engineering Department and its Accounting Department might be assigned separate VLANs. Each department may have devices located in both data centers 102 and 106.

Further, where a sender wishes to target a subset of members of a VLAN for a communication, a multicast groups may be used to send communications to such subset of VLAN members. For example, a VLAN for an Accounting Group may include devices A, B, C, D, and E. And a first multicast group_1 may include devices A, B and C, and a second multicast group_2 may include devices C, D and E. An entity that wishes to send a transmission to devices A, B and C of the Accounting Group may do so by designating the VLAN for the Accounting Group and multicast group_1 (which includes A, B and C) in its transmission.

As shown in FIG. 2, the distributed system 200 supports "n" VLANs (e.g., a 100 VLANs). In one embodiment, for each redundancy group 202 and 204, member edge devices run a designated forwarder (DF) election to elect a designated forwarder on a per VLAN basis for the redundancy group. Mechanisms for making a designated forwarder election are provided under Ethernet Virtual Private Network Border Gateway Protocol (E-VPN's BGP), and other communications protocols for the purpose, among other things, of providing redundancy.

Configuring multihoming on edge devices can provide that if one edge device breaks down or becomes unreachable, other devices of the redundancy group can ensure connectivity for the traffic which the failing edge device was handing. Various implementations of multihoming are possible. In some implementations, some edge devices may function simply as backup devices, and not usually participate in transmission of data traffic. For example, in some embodiments, one edge device may be chosen as the forwarder for all traffic handled by a redundancy group by running a designated forwarder element among the members of the redundancy group.

In other implementations, each edge device may handle a subset of traffic handled by a redundancy group, and the designated forwarder election may be used to determine the allocation of traffic as between the member edge devices of the redundancy group. In such implementations, use of the designated forwarder election may allow for distribution of traffic across multiple edge devices of a redundancy group thus maximizing the bandwidth potential of an interface served by a redundancy group in addition to providing redundancy.

The designated forwarder may be chosen through either a Border Gateway Protocol or Virtual Private LAN Service path-selection procedure. In some embodiments, the designated forwarder election of Ethernet Virtual Private Network Border Gateway Protocol (E-VPN's BGP) may be used. The designated forwarder election may be performed when the system first comes up (i.e., when the switches in a redundancy group are turned on and discovers one another. In some embodiments, the election may then be rerun when any link, node or port failure condition occurs. As noted above, if a designated forwarder loses connectivity with a data center, an alternate edge device(s) may then take over as the designated forwarder for the traffic previously handled by the edge device which has lost connectivity.

It will be understood that techniques of the present disclosure are not limited to systems which run an Ethernet Virtual Private Network Border Gateway Protocol (E-VPN BGP) Designated Forwarder (DF) election, or to systems where the designated forwarder election is used to apportion traffic on a per VLAN basis. Rather, the techniques are applicable to any systems having mechanisms for electing a particular gateway device as the device responsible for forwarding a subset of data traffic into or out of a data center.

In some embodiments, a designated forwarder election may be used to assist in stitching multicast trees together in order to facilitate end to end multicast connectivity of VLANs.

Figure 3:
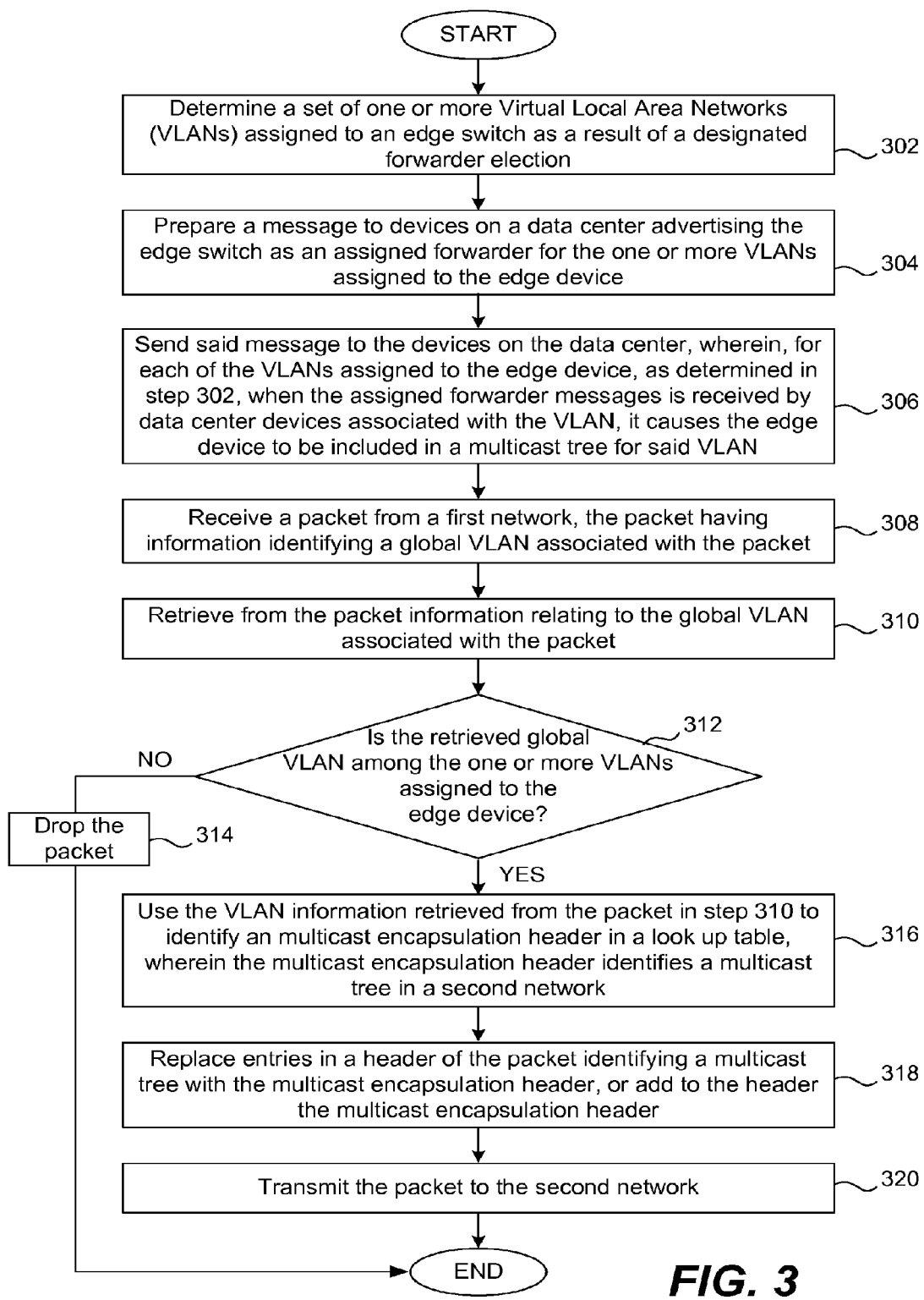
FIG. 3 is a simplified high-level flowchart depicting an example method of interconnecting multicast trees from different networks according to an embodiment of the present disclosure.

FIG. 3 is a simplified high-level flowchart depicting an example method of interconnecting multicast trees from different networks according to an embodiment of the present disclosure.

At 302, an edge device determines a set of one or more Virtual Local Area Networks (VLANs) assigned to the edge device by using a designated forwarder election. As noted above, the designated forwarder election may be performed among a group of edge devices that constitute a redundancy group.

For example, in the system shown in FIG. 2, each of redundancy groups 202 and 204 may run its own designated forwarder election and select a designated forwarder for each of the "n" VLANs supported by the system. For example, the members of redundancy group_1 202 (that is, edge device_A 120 and edge device_B 122) may run a designated forwarder election which results in each of these edge device being assigned a portion of the total traffic handled by redundancy group_1 202. For example, edge device_A 120 may be assigned as the designated forwarder for all odd numbered VLANs, and edge device_B 122 may be assigned as the designated forwarder for all even numbered VLANs. Under this allocation, edge device_A 120 would be responsible for forwarding all multicast and broadcast data traffic coming into or out of the data center 102 that is associated with an odd numbered VLAN. Correspondingly, edge device_B 122 would be responsible for forwarding all multicast and broadcast data traffic coming into or out of the data center 102 that is associated with an even numbered VLAN.

The designated forwarder for a particular set of VLANs may be chosen through either a Border Gateway Protocol or Virtual Private LAN Service path-selection procedure. The election of designated forwarder(s) may promote goals, such as redundancy and bandwidth maximization, in addition to facilitating stitching of multicast trees.

Once a designated forwarder election has been run, in some embodiments, edge devices (for example, edge device 120 or 122 of data center site_1 102) may use the outcome of the designated forwarder election to prune shared multicast trees in data center site_1 102, on a per VLAN basis. One way this can be accomplished is by advertising which VLANs have been assigned to which VLANs to the devices in the data center at issue.

For example, at 304, the edge device prepares a message to devices on a data center advertising the edge device as an assigned forwarder for the set of VLANs determined as being assigned to the edge device in step 304. In 306, the edge device sends the message to the devices on the data center, wherein, as a result of the message, the edge device is included in multicast trees corresponding to the VLANs determined in step 302 as being assigned to the edge device.

In some embodiments that involve use of TRILL protocol to transmit traffic within a data center, pruning multicast trees within the data center may be accomplished by having an edge device 120 or 122 that is elected as the designated forwarder for a set of VLANs V1 . . . Vn, advertise its status in TRILL Intermediate System to Intermediate System Link State Packets (IS-IS LSPs) to devices of the relevant data center. In some embodiments, the edge device that is elected (for example, using Border Gateway Protocol) as the Designated Forwarder for a set of VLANs may indicate in the LSPs that it is the Appointed Forwarder (AF) for those VLANs. Whereas, the non-Designated Forwarder edge devices do not advertise Appointed Forwarder state for the set of VLANs.

These actions may be used to prune the non-Designated Forwarder edge devices out of the TRILL multicast tree for the associated VLANs. This technique can be used to prune non-designated-forwarder edge devices out of the TRILL multicast trees for their associated VLANs. It will be understood that other protocols may also be used in other embodiments to transmit information regarding the results of a designated forwarder election to devices of a data center. The designated forwarder edge device may also set the Internet Protocol V4/V6 Multicast Router bits for the VLANs to attract Multicast Listener Discovery/Internet Group Management Protocol (MLD/IGMP) announcements or Multicast Router Discovery (MRD) queries. It will be understood that other protocols may also be used to accomplish the above described or similar functions.

One objective achieved by pruning shared multicast trees is to avoid wasting bandwidth on links inside the data center. Pruning multicast trees prevents flooded traffic within a data center 102 or 104 from being forwarded to edge devices 120, 122, 124 and 126 who are not the assigned forwarders for such traffic. Forwarding VLAN traffic to an edge device that is not the designated forwarder for such traffic can be wasteful as traffic is forwarded only to be dropped at the (unassigned) edge device.

In addition to the pruning described above, edge devices 120 and 122 may also use the outcome of a designated forwarder election to apply filtering to any received multi-destination packets.

In 308, the edge device receives a packet from a first network, the packet having information identifying an inner VLAN associated with the packet. The inner VLAN may be a same VLAN in both the sending data center and the receiving data center. The inner VLAN may be provided by a customer or by a provider network. In some embodiments, the inner VLAN may be associated with the packet throughout the course of its transmission from a source entity to a destination entity.

In 310, the edge device retrieves from the packet information relating to the inner VLAN associated with the packet. In 312, the edge device determines whether the inner VLAN identified in the packet is among the set of VLANs assigned to the edge device. In 314, if it is determined that the inner VLAN associated with the packet is not among the one or more VLANs assigned to the edge device, the edge device may drop the packet.

In some embodiments, in such filtering, a determination of whether the packet is a multicast or broadcast packet may also be made. In some embodiments, the edge device may only process and forward multicast and broadcast packets that are associated with VLANs assigned to the edge device in question. The edge devices may drop all other multi-destination packets. In some embodiments, such filtering may be applied to packets which are being transmitted in the disposition direction (for example, from WAN 106 to data center site_1 102), as well as to packets which are being transmitted in the imposition direction (for example, from data center site_1 102 to WAN 106).

Note that imposition filtering may be used as an alternative to the measures described above for multicast tree pruning, or as an additional safeguard even where mechanisms for multicast tree pruning are in place. Having an additional safeguard can be useful because in some protocols such as TRILL implementing per-VLAN multicast tree pruning may be optional. For example, if the option is turned off and the multicast tree pruning discussed above is not implemented, it is possible that devices 108, 110 and 112 of FIG. 2 may send packets or frames to both edge device 120 and edge device 122 when they flood packets in a multicast transmission. Imposition filtering can be used to help guarantee that only the edge device elected as the designated forwarder forwards multicast traffic for a given VLAN to the core network (for example, WAN 106). This can insure that duplicate copies of the same multicast traffic are not transmitted to the WAN 106.

In 316, if it is determined that the inner VLAN associated with the packet is among the one or more VLANs assigned to the edge device, the edge device uses the VLAN information retrieved from the packet in step 310 to identify a multicast encapsulation header in a look up table. The multicast encapsulation header identifies a multicast tree in a second network.

As noted above, an edge device may be receiving traffic both in the Multiprotocol Label Switching (MPLS) imposition direction from a data center to a WAN, or in the MPLS disposition direction from a WAN to a data center. In some embodiments, the edge device may maintain two mapping tables to handle the two possible directions of data flow.

In the MPLS imposition direction, a table which identifies a Label Switched Multicast (LSM) tree based on the lookup of either (i) the inner VLAN and a multicast destination address, or (ii) the inner VLAN alone, may be used. The use of a key that includes the inner VLAN and an inner multicast address may be useful for identifying a relevant multicast encapsulation header in a context where a selective tree is desired. The use of a key that includes just the inner VLAN may be useful for identifying a relevant multicast encapsulation header in a context where inclusive trees are being used. The terms selective and inclusive trees are explained further below.

In the MPLS disposition direction, a table which maps the multicast destination address and inner VLAN to a local RBridge nickname identifying the root of a local TRILL Multipoint to Multipoint (MP2MP) tree, may be used.

In 318, the edge device appends to or replaces entries in a header of the packet identifying a multicast tree with the multicast encapsulation header identified in the look up table in step 316. That is, in 318, the header that is identified in step 316 may be added to the packet (i.e. used as an additional encapsulation) or it may be used as a replacement of an existing multicast header. In 320, the edge device transmits the packet to the second network.

FIG. 4 depicts examples of look up table entries according to an embodiment of the present disclosure. In order to facilitate a seamless handoff of multicast traffic from one network to another, various embodiments of the present disclosure provide techniques and mechanisms for appending to or replacing a portion of a packet header containing multicast tree information corresponding to a first network with a multicast encapsulation header comprising multicast tree information corresponding to a second network. The first network being one from which the packet is being received, and the second network being one to which the packet is being transmitted next.

In one embodiment, example look up table 400 may be used to store a multicast encapsulation header including information identifying a multicast tree in a network to which a packet is being forwarded. Look up table 400 includes a column 402 for an inner multicast address which may identify a destination multicast group, a column 404 for an inner VLAN which may identify a VLAN associated with the multicast transmission, and a column 406 for a multicast encapsulation header which contains information identifying a relevant multicast tree in a network to which the packet may be transmitted next. In some embodiments, the inner multicast address and the inner VLAN may be provided by a provider. In some other embodiments, the inner multicast destination address and the inner VLAN may be provided by a customer.

The information in the multicast encapsulation headers stored in column 406 can be used to provide the appropriate encapsulation to apply to the packet. In some embodiments, the encapsulation header may include some or all of outer MAC addresses to be used for hop by hop transmission on legacy networks, and TRILL nicknames corresponding to ingress and egress devices on a TRILL network, among other things.

As noted above, the distributed system 100 such as that shown in FIG. 2 may allow users to send packets within a plurality of VLANs. n FIG. 2, n VLANs (e.g., 100 VLANs) are provided. VLANs define a broadcast domain. Including an inner VLAN identifier (such as that identified in column 402 of look up table 400) in a packet header may allow for transmission of a packet, throughout all segments of the packet's journey from a source to a destination, within a particular VLAN.

Using an inner multicast destination address (such as that identified in column 404 of look up table 400) allows for transmission at a finer granularity within a particular VLAN. The multicast address may identify a destination multicast group, and using this identifier may make it possible to selectively transmit a packet to particular members within a VLAN.

Including in the look up table 400 a column for information relating to a packet's multicast destination address 404 allows an edge device to choose a more selective tree. Such a look up table may be used in both directions, from core to site, or from site to core. But, in some embodiments, such a look up table may be used for transmissions from a core network 106 to a data center 102 or 104. Such a look up table can allow for mapping different multicast groups of the same VLAN into their own particular trees, facilitating more efficient multicast transmissions within data centers.

Another type of mapping may be desirable in situations where the number of multicast groups in a network is much larger, and thus storing all the information that are required to identify particular multicast group trees within the VLANs is simply prohibitive, or else undesirable from a resource allocation point of view. For example, this may be the case for a core network. In some embodiments, therefore, the look up tables used in identifying packet forwarding information for transmission from a data center to the core network, for example, may use a more limited look up table. Rather than employing a look up for a selective tree such as that depicted in FIG. 4, a look up table such as that shown in FIG. 5 may be employed.

FIG. 5 illustrates a particular example of look up table entries that may be used to stitch multicast trees together according to an embodiment of the present disclosure. Look up table 500 includes a column 502 for an inner VLAN which identifies the VLAN in which the multicast transmission is being sent, and a column 504 for multicast encapsulation headers containing multicast tree identifying information. It does not contain a column for an inner multicast destination address as look up table 400 does.

In some embodiments, the edge switch may look up a multicast encapsulation header using different keys (for example, one key may be an inner VLAN alone, and another key may be an inner VLAN together with an inner multicast destination address) depending on the direction in which a packet is being transmitted (that is, from a data center into a WAN or from a WAN into a data center). In some implementations, the look up table 400 may store information relating to both keys, but the system may mask out certain portions of the table, depending on the direction a packet is travelling and/or on a desired configuration (for example, depending on whether look up for an inclusive tree or a selective tree is desired). In other implementations, separate look up tables for a selective tree 400 and an inclusive tree 500 can be configured and stored, and the appropriate look up table can be chosen and used depending on which type of multicast tree selection granularity is desired for the particular transmission. It will be understood that, in some embodiments, one look up table (for example, a look up table such as the one depicted in FIG. 4) may be utilized for identifying a multicast encapsulation header for packets travelling from the core 106 to a site 102 or 104, and a second look up table, (for example, a look up table such as the one depicted in FIG. 5) may be utilized for identifying a multicast encapsulation header for packets travelling in the opposite direction. In other embodiments, the information in the two look up tables may be consolidated, and the same look up table may be used for identifying a multicast encapsulation header regardless of the direction in which a packet is travelling. It will also be understood that, in other embodiments, the look up tables may also include other information and/or serve other functions in addition to the ones described above.

Figure 6:
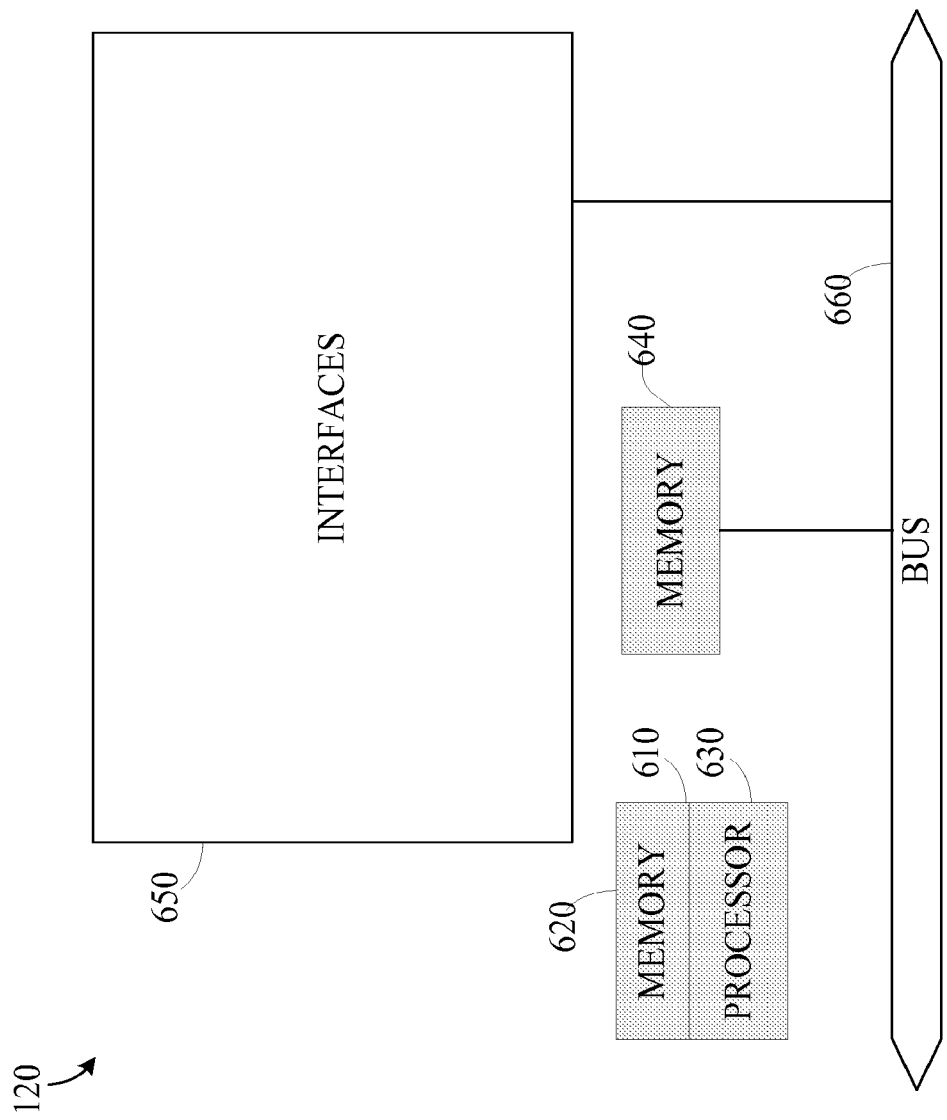
FIG. 6 is a simplified block diagram of an example edge device suitable for implementing some embodiments of the present disclosure.

FIG. 6 is a simplified block diagram of an example edge device 120 suitable for implementing some embodiments of the present disclosure. As described above, techniques for stitching multicast trees may be performed in a variety of switches, routers or other network devices serving as edge devices. According to various embodiments, an edge device 600 includes a processor, network interfaces, and memory. A variety of ports, Media Access Control (MAC) blocks, and buffers can also be provided as will be appreciated by one of skill in the art. In addition, although exemplary switches are described, the above-described embodiments may be implemented in a variety of network devices (e.g., servers) as well as in a variety of mediums.

Referring now to FIG. 6, an edge device 120 suitable for implementing embodiments of the present disclosure includes a master central processing unit (CPU) 610, interfaces 650, and a bus 660 (for example, a PCI bus). When acting under the control of appropriate software or firmware, the CPU 610 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 610 may include one or more processors 630 such as a processor from the Motorola family of microprocessors or the MIPS family of microprocessors. In an alternative embodiment, processor 630 is specially designed hardware for controlling the operations of edge device 120. In a specific embodiment, a memory 620 (such as non-volatile RAM and/or ROM) also forms part of CPU 610. However, there are many different ways in which memory could be coupled to the system. Memory block 610 may be used for a variety of purposes such as, for example, caching and/or storing data, programming instructions, etc.

The interfaces 650 are typically provided as interface cards (sometimes referred to as "line cards"). Generally, they control the sending and receiving of packets or packet segments over the network and sometimes support other peripherals used with the edge device 120. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 610 to efficiently perform switching and/or routing computations, network diagnostics, security functions, etc.

Although the system shown in FIG. 6 is one specific edge device of the present disclosure, it is by no means the only edge device architecture on which the present disclosure can be implemented. For example, an architecture having a single processor that handles communications as well as switching and/or routing computations, etc. is often used. Further, other types of interfaces and media could also be used with the switch.

Regardless of an edge device's configuration, it may employ one or more memories or memory modules (such as, for example, memory block 640) configured to store data, program instructions for the general-purpose network operations and/or the inventive techniques described herein. The program instructions may control the operation of an operating system and/or one or more applications. The memory or memories may also be configured to store fair share values and parameters, burst thresholds, minimum and maximum thresholds, option selection bits, class parameters/specifications, timers, queue characteristics, packet arrival history parameters, etc.

Because such information and program instructions may be employed to implement the systems/methods described herein, the present disclosure relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store Examples of program instructions include both machine code, such as produced by a compiler, and files containing higher level code that may be executed by the computer using an interpreter.

While the disclosure has been particularly shown and described with reference to specific embodiments thereof, it will be understood by those skilled in the art that changes in the form and details of the disclosed embodiments may be made without departing from the spirit or scope of the disclosure. For example, embodiments of the present disclosure may be employed with a variety of network protocols and architectures. It is therefore intended that the disclosure be interpreted to include all variations and equivalents that fall within the true spirit and scope of the present disclosure.

What is claimed is:

1. A method, comprising
    determining, at an edge device of a first network, two or more Virtual Local Area Networks (VLANs) assigned to the edge device as a result of a designated forwarder election; and
    sending an assigned forwarder message to one or more devices in the first network, the assigned forwarder message advertising the edge device as a designated forwarder for the VLANs assigned to the edge device, and
    for each of the VLANs assigned to the edge device, when received by specific ones of the devices in the first network that are associated with the VLAN, the assigned forwarder message causing the edge device to be included in a multicast tree for the VLAN.

2. The method of claim 1, further comprising:
    receiving a packet from the first network over a multicast tree, the packet having information identifying a VLAN associated with the packet;
    retrieving the VLAN information associated with the packet;
    determining whether the VLAN associated with the packet is a VLAN for which the edge device has been assigned as the designated forwarder;
    dropping the packet when the packet is not associated with a VLAN for which the edge device has been assigned as the designated forwarder; and
    processing the packet when the packet is associated with a VLAN for which the edge device has been assigned as the designated forwarder.

3. The method of claim 2, wherein the designated forwarder election is performed using Border Gateway Protocol.

4. The method of claim 2,
    wherein processing the packet comprises using the VLAN information retrieved from the packet to identify a multicast encapsulation header in a look up table; and
    wherein the multicast encapsulation header comprises information identifying a multicast tree in a second network, the second network being one to which the packet is being forwarded.

5. The method of claim 4, further comprising:
    modifying or replacing multicast tree entries in a header of the packet identifying a multicast tree in the first network with information from the identified multicast encapsulation header corresponding to a multicast tree in the second network, or appending the identified multicast encapsulation header to the header of the packet; and
    transmitting the packet to the second network.

6. The method of claim 4, wherein the packet has information identifying a multicast address associated with the packet, and the method further comprising:
    retrieving the information relating to the multicast address associated with the packet; and
    using the retrieved multicast address information at least in part to identify the multicast encapsulation header in the look up table.

7. The method of claim 1, further comprising:
    receiving a packet from the first network, a header of the packet having information identifying a VLAN and a multicast address of the packet as well as information identifying a first multicast tree of the first network;
    replacing the information in the packet header identifying a first multicast tree with replacement information identifying a second multicast tree in a second network, or appending to the packet header the replacement information identifying a second multicast tree in a second network; and
    transmitting the packet to the second network.

8. The method of claim 5, wherein the designated forwarder election is performed between a plurality of edge devices that comprises a redundancy group, wherein the other edge devices of the plurality of edge devices in the redundancy group do not send message advertising themselves as an assigned forwarder for the one or more VLANs, and wherein the other edge devices are not included in the multicast trees relating to the one or more VLANs.

9. The method of claim 1, wherein edge devices not assigned as the designated forwarder for the one or more VLANs do not send a message advertising themselves as the assigned forwarder for the determined one or more VLANs and are not included in the multicast trees relating to those VLAN.

10. An apparatus for serving as an edge device in a first network, comprising:
    a plurality of interfaces configured to send and receive messages, and one or more processors and associated memory configured to:
    determine, at the edge device of the first network, two or more Virtual Local Area Networks (VLANs) assigned to the edge device as a result of a designated forwarder election; and
    send an assigned forwarder message to one or more devices in the first network, the assigned forwarder message advertising the edge device as a designated forwarder for the VLANs assigned to the edge device, and
    for each of the VLANs assigned to the edge device, when received by specific ones of the devices in the first network that are associated with the VLAN, the assigned forwarder message causing the edge device to be included in a multicast tree for the VLAN.

11. The apparatus of claim 10, wherein the one or more processors and associated memory are further configured to:
receive a packet from the first network over a multicast tree, the packet having information identifying a VLAN associated with the packet;
retrieve the VLAN information associated with the packet;
determine whether the VLAN associated with the packet is a VLAN for which the edge device has been assigned as the designated forwarder;
drop the packet when the packet is not associated with a VLAN for which the edge device has been assigned as the designated forwarder, wherein the packet is dropped even if the packet is being transmitted from the first network to a core network; and
process the packet when the packet is associated with a VLAN for which the edge device has been assigned as the designated forwarder.

12. The apparatus of claim 11, wherein the designated forwarder election is performed using Border Gateway Protocol.

13. The apparatus of claim 11,
wherein processing the packet comprises using the VLAN information retrieved from the packet to identify a multicast encapsulation header in a look up table; and
wherein the multicast encapsulation header comprises information identifying a multicast tree in a second network, the second network being one to which the packet is being forwarded.

14. The apparatus of claim 13, wherein the one or more processors and associated memory are further configured to:
modify or replace multicast tree entries in a header of the packet identifying a multicast tree in the first network with information from the identified multicast encapsulation header corresponding to a multicast tree in the second network, or appending the identified multicast encapsulation header to the header of the packet;
transmit the packet to the second network.

15. The apparatus of claim 13, wherein the packet has information identifying a multicast address associated with the packet, and wherein the one or more processors and associated memory are further configured to:
retrieve the information relating to the multicast address associated with the packet; and
use the retrieved multicast address information at least in part to identify the multicast encapsulation header in the look up table.

16. The apparatus of claim 10, wherein the one or more processors and associated memory are further configured to:
receive a packet from a first network, the packet having information identifying a VLAN and a multicast of the packet as well as information identifying a first multicast tree of the first network; and
replace the information in the packet identifying a first multicast tree with replacement information identifying a second multicast tree in a second network; and
transmit the packet to the second network.

17. The apparatus of claim 10, wherein the designated forwarder election is performed between a plurality of edge devices that comprises a redundancy group, wherein the other edge devices of the plurality of edge devices in the redundancy group do not send message advertising themselves as an assigned forwarder for the one or more VLANs, and wherein the other edge devices are not included in the multicast trees relating to the one or more VLANs.

18. The apparatus of claim 10, wherein edge devices not assigned as the designated forwarder for the one or more VLANs do not send a message advertising themselves as the assigned forwarder for the determined one or more VLANs and are not included in the multicast trees relating to those VLAN.

19. A non-transitory computer readable storage medium having computer program instructions stored thereon for performing the following operations:
determining, at an edge device of a first network, two or more Virtual Local Area Networks (VLANs) assigned to the edge device as a result of a designated forwarder election; and
sending an assigned forwarder message to one or more devices in the first network, the assigned forwarder message advertising the edge device as a designated forwarder for the VLANs assigned to the edge device, and
for each of the VLANs assigned to the edge device, when received by specific ones of the devices in the first network that are associated with the VLAN, the assigned forwarder message causing the edge device to be included in a multicast tree for the VLAN.

20. An apparatus comprising:
means for determining, at an edge device of a first network, two or more Virtual Local Area Networks (VLANs) assigned to the edge device as a result of a designated forwarder election; and
means for sending an assigned forwarder message to one or more devices in the first network, the assigned forwarder message advertising the edge device as a designated forwarder for the VLANs assigned to the edge device, and
for each of the VLANs assigned to the edge device, when received by specific ones of the devices in the first network that are associated with the VLAN, the assigned forwarder message causing the edge device to be included in a multicast tree for the VLAN.

* * * * *